United States Patent [19]

Cokelekoglu

[11] 4,390,164

[45] Jun. 28, 1983

[54] PRESS LOCK SYSTEM FOR RAILING CONSTRUCTION

[76] Inventor: Erden Cokelekoglu, 3685 County Rd. #42, Windsor, Ontario, Canada, N9A 6J3

[21] Appl. No.: 305,026

[22] Filed: Sep. 23, 1981

[51] Int. Cl.³ .................................. E04H 17/14
[52] U.S. Cl. ........................... 256/65; 403/263
[58] Field of Search .............. 256/65, 22, 59, 21; 403/263

[56] References Cited

U.S. PATENT DOCUMENTS 3,955,799  5/1976  Lauzier ........................... 256/21
4,014,520  3/1977  Walters .......................... 256/65 X
4,334,671  6/1982  DeGuise ......................... 256/65

Primary Examiner—Andrew V. Kundrat
Attorney, Agent, or Firm—Charles Krassov

[57] ABSTRACT

This invention consists of a method and components for the construction of railing in general, and balcony railing, in particular. The railing which is of the usual type, having an upper hand rail and a bottom base or footrail with equally spaced baluster bars in between, is constructed so that all parts are joined and held together by means of pressure applied to these parts, which causes them to snap into one another. This is possible to accomplish due to the resilient character of the materials or metals used in the construction of the railing.

2 Claims, 5 Drawing Figures

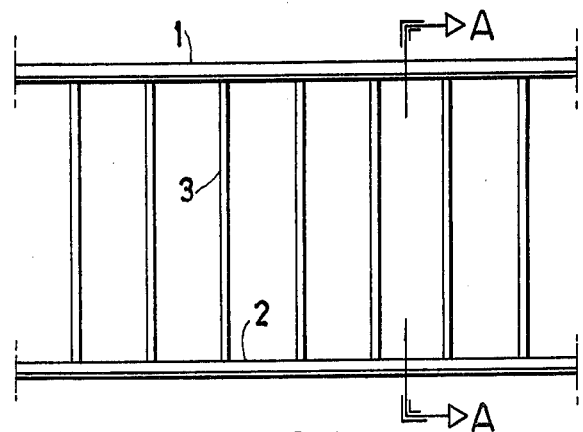
FIG. 1
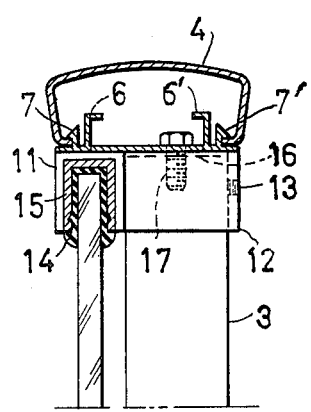
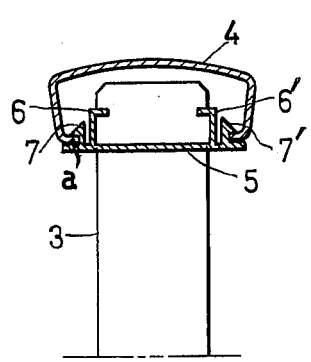
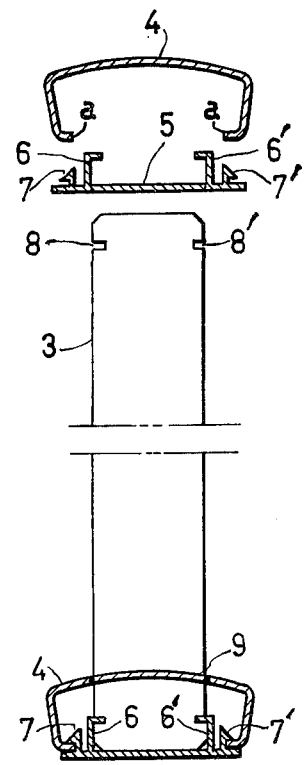
FIG. 3
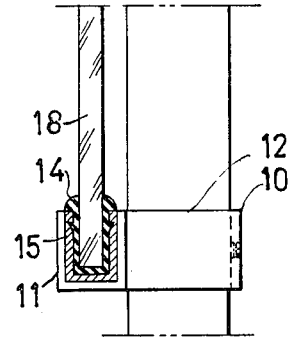
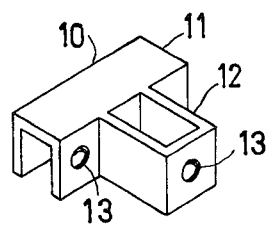
FIG. 4   FIG. 5   FIG. 2

PRESS LOCK SYSTEM FOR RAILING CONSTRUCTION

This invention consists of the construction and components of fencing or railing used for various purposes, and particularly in enclosing balcony areas.

The main object of this invention is to provide a safe and rigidly constructed fence or railing without the need of welding, and with a minimal use of bolts or any other type of fastener. This is accomplished in the invention by providing railing components which are snapped and held together by applying pressure to said components, taking advantage of the resilient nature of the metals used in railing construction.

Another object of this invention is to substantially reduce the cost of labor and material, and the installation time. This will become obvious from the construction process, and the components used further on described.

In describing the invention reference will be made to the attached drawings in which, FIG. 1 shows a section of railing, FIG. 2 shows section A—A of FIG. 1, in a partly exploded and partly assembled view, FIG. 3 shows an assembled view of the exploded part of FIG. 2.

FIG. 4 shows a section of an assembled railing in which panelling is added to the usual baluster construction, and FIG. 5 is an isometric view of one of the additional parts used in the construction referred to in FIG. 4.

In the drawings the railing is shown to consist of a handrail 1, a footrail 2, and balusters 3 which are located between the handrail and footrail and join them together.

The handrail 1 consists of a cover strip 4, the upper face of which is slightly convex, and is wide enough to form the width of the handrail 1. The strip 4 is bent downwardly on each of its sides to form the walls of the handrail 1. These wall are bent inwardly at a small angle, and each wall terminates at the bottom thereof into a short inwardly bent horizontal section "a".

The handrail 1 is also provided with a base plate strip 5. Extending upwardly from the upper surface of the plate 5, and near its sides, are a pair of short hooks, hook 7 at the left side thereof and 7' at the right. The hooks 7 and 7' toe outwardly. In between the hooks 7 and 7' and adjacent to them is a pair of inverted "L"-shaped hooks, hook 6 on the left and hook 6' on the right; as shown in the drawings these hooks toe inwardly. The base strip 5 is also provided with a plurality of punched holes, to correspond with, and through which pass the tops of the balusters 3.

The balusters 3 are rectangular or square in cross-section, and each is provided with a pair of opposite and parallel channels, 8 on the left and 8' on the right of and near each end of the baluster.

The footrail has the same components as the above described handrail, however, the holes for the passage therethrough of the bottom end of the balusters are punched in the cover plate 4, at 9.

The assembly of the railing is rapid and effective. The construction of the handrail consists of inserting the baluster 3 into the plate 5, and forcing it between the hooks 6 and 6' until their short horizontal "L"-shaped parts slip into their respective channels 8 and 8'. In the next step, the cover strip 4, ie pressed into the plate 5, so that the sides of the cover strip spread over the inclined surfaces of the hooks 7 and 7', and the horizontal bends of said sides slip into the said hooks and are held by them.

The assembly of the footrail is similar to the above described assembly of the handrail, the only difference being that the holes through which the balusters 3 are inserted, are punched in the cover plate 4 instead of the baseplate 5.

Occasionally it is required to add to the regular balusters, some panelling, in which case it becomes necessary to depart from the usual construction of the railing as described above. In this invention, the departure from the standard baluster railing construction does not involve any radical changes, since the handrail construction is the same plus the addition of a panel supporting component.

A section through the panelled railing as represented in FIG. 4, shows the handrail being constructed as described above, in connection with the baluster railing, but with the addition of a bracket 10 which consists of a "U"-shaped channel 11, to one side of which is attached an open top and bottom rectangular box 12. The channel 11 and the box 12 are in some cases provided with a tapped setscrew hole 13. When used in conjunction with the hadrail, the box 12 has its open top enclosed with a plate 16 by means of which a bolt 17 secures the bracket 10 to the base 5. The upper end of the baluster 3 is inserted into and contained within the box 12; and its lower end is located in, or passes through a box 12 in which the channel 11 points upwardly. A panel 18 is supported at its top and bottom by the oppositely pointing channels 11. The horizontal edges of the panel 18 are housed within rubber inserts 14 which are in turn housed within and attached to fillers 15 which are located tightly within the upwardly and downwardly pointed channels 11.

From the above description it can be seen that with only a few variations, such as the addition of the panel and its fittings, the construction is the sames as in the railing with balusters.

Having described the invention, what I claim is:

1. The construction of railing for use on balconies and other similar installations, by means of components which snap and hold together by the application of pressure, comprising a handrail which consists of a slightly convex handrail cover, of a width to provide a hand grip, the ends of said cover being bent downwardly and at a small angle inwardly, into two opposite handrail walls, which are further bent inwardly into short horizontal bends; a handrail base which attaches to said handrail cover, consisting of a flat plate, a pair of short, vertical, cover-holding hooks attached to the upper face of said plate, facing away from each other, and each hook being located near each of the sides of said baseplate; a pair of spaced, vertical, inwardly facing hooks also attached to the upper face of said base plate, located symmetrically between the said cover-holding hooks, and extending slightly above them; a plurality of uniformly spaced holes provided in said baseplate for the passage therethrough of the upper end of each baluster; a footrail constructed substantially the same as the said handrail, with the exception that the baluster penetration holes are provided in the cover plate instead of the baseplate; and a plurality of vertical balusters, each having two opposite flat walls, provided with horizontal channels into which hook the baluster hooks of the baseplate.

2. The construction and components of railing such as described in claim 1, with the addition of panelling to said railing, comprising in combination a handrail such as described in claim 1; a panel-holding bracket consisting of a U-shaped channel, for inserting therein one of the edges of a rectangular panel; an open top and bottom box attached to one side of said U-shaped channel, for containing therein the upper or lower end of each baluster; some of said baluster containing boxes being provided with a closed top by means of which said U-shaped bracket is attached to the baseplate of the handrail, with the said U-shaped channel of the bracket pointing downwardly; a similar bracket, located where the footrail would normally be, and replacing said footrail, and having its U-shaped channel pointing upwardly; a U-shaped filler fitting tightly into each of said bracket channels; a U-shaped rubber insert located and held within each of said fillers; and a rectangular panel of glass or an opaque material whose upper and lower edges are located within and held by said rubber inserts.

* * * * *